Sept. 24, 1968  J. R. STORY ET AL  3,403,106
BUOYANT SOAP CAKE AND PREPARATION THEREOF
Filed July 12, 1965  2 Sheets-Sheet 1

INVENTORS:
JULIAN R. STORY
MICHAEL G. NORMAN
ERIC JUNGERMANN
BY
*Carl C. Batz*
ATT'Y Sept. 24, 1968   J. R. STORY ET AL   3,403,106
BUOYANT SOAP CAKE AND PREPARATION THEREOF
Filed July 12, 1965   2 Sheets-Sheet 2

INVENTORS:
JULIAN R. STORY
MICHAEL G. NORMAN
ERIC JUNGERMANN

BY: *Carl C. Batz*
ATT'Y

United States Patent Office 3,403,106
Patented Sept. 24, 1968

3,403,106
BUOYANT SOAP CAKE AND PREPARATION
THEREOF
Julian R. Story, Wheaton, Michael G. Norman, Cicero, and Eric Jungermann, La Grange, Ill., assignors to Armour and Company, Chicago, Ill., a corporation of Delaware
Filed July 12, 1965, Ser. No. 471,374
2 Claims. (Cl. 252—92)

This invention relates to a buoyant soap cake and to the preparation thereof, and more particularly to a buoyant cake of soap simulating a mobile object which has its center of volume above its center of mass and to the preparation of such a product.

An object of the invention is to provide a boyant cake of soap having at least its top surface contoured to simulate a mobile object and having its center of volume above its center of mass whereby said top surface is maintained uppermost when the cake is floating in water. A further object is to provide new and improved methods for producing such soap cakes. Another object is to provide a buoyant cake of soap in which the cake is equipped with an air-containing capsule, the capsule being so disposed within the cake that the center of mass of the cake is below its center of volume. Yet another object is to provide a soap cake equipped interiorly with a capsule consisting of separable parts and a movable prize object contained within the capsule. Other specific objects and advantages will appear as the specification proceeds.

The invention is shown, in an illustrative embodiment, by the accompanying drawing, in which—

Figure 1:
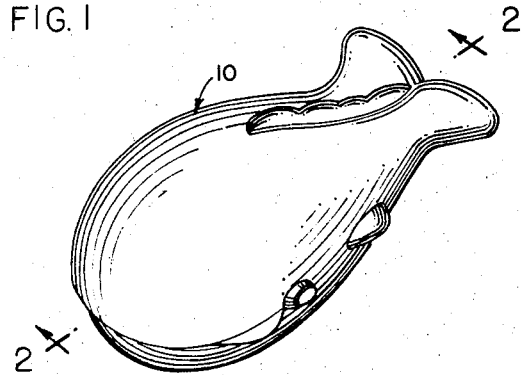
Figure 2:
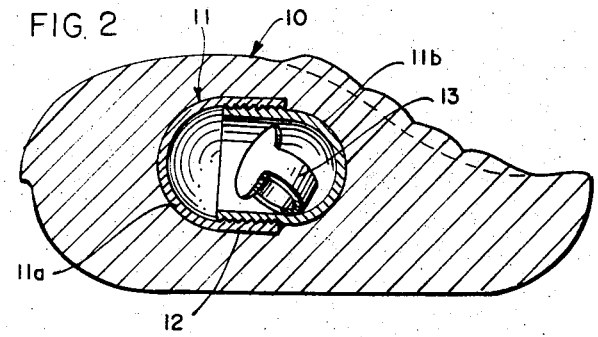
Figure 3:
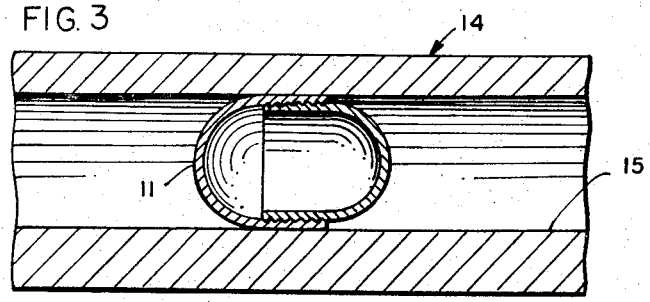
Figure 4:
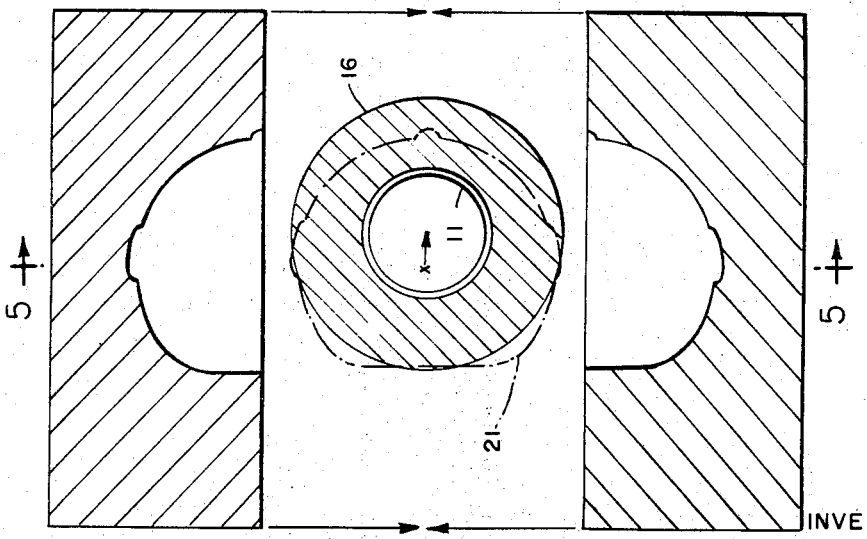

FIGURE 1 is a perspective view of a cake of soap embodying our invention, the soap cake being countoured to simulate a miniature whale; FIG. 2, a longitudinal sectional view, the section being taken as indicated at line 2—2 of FIG. 1; FIG. 3, a sectional view of an extruded tube of soap containing a capsule and illustrating one mode of fabricating the soap cake; FIG. 4, a transverse sectional view of mold segments in another method of forming the soap cake, the section being taken as indicated at line 4—4 of FIG. 5; and FIG. 5, a longitudinal sectional view, the section being taken as indicated at line 5—5 of FIG. 4.

In the illustration given, 10 designates a soap cake which has been molded in the shape of a miniature whale. Mounted within the whale is a capsule 11 formed of plastic, such as, for example, polypropylene or other suitable material, and the capsule is formed of the telescoping parts 11a and 11b which may be secured together by threads 12. The capsule 11 may be of any desired shape. We prefer, however, to employ an elongated or elliptical shape. Within the elongated capsule 11 is placed a movable object, which in the illustration given is a ring 13. It will be understood that such movable objects may be toys formed of metal, plastic, or other material and which constitute prizes for the child using the soap.

The capsule 11 is so disposed within the cake of soap as to make the center of the mass of said cake below its center of volume and thus maintain the contoured upper surface of the cake uppermost so that when the cake is floating in the water, it has the appearance of a small whale in motion. Even though the cake is dropped into the water to dive below the surface, the capsule causes the cake to right itself and to maintain its upper distinctive surface uppermost in the water. Thus, the portion of the cake which is least distinctive is kept in contact with the water, while the distinctive top surface simulating the whale or other toy remains largely out of the water, while floating. The capsule thus protects the upper distinctive toy design of the soap for a longer period because it is held largely out of the water.

The prize object 13 within the elongated shell of the capsule may also be utilized by the child in playing with the soap cake because by tilting the soap cake in one direction and causing the object to move to one end of the capsule, there is a slight change in the tilt of the whale or other object while floating in the water.

The telescoping segments of the capsule are securely held together by the soap cake and protected during shipment and handling, etc. Yet, when the cake as dissolved, the capsule segments are readily separated and the prize item recovered.

The cake of soap having its center of volume above its center of mass may be formed by a variety of methods. We prefer to accomplish this result by introducing an air-containing capsule within the contoured cake of soap. However, in producing such cakes of soap in quantity and with the capsules properly and accurately disposed within the cake, we have discovered methods by which this can be effectively accomplished. One method, as illustrated in FIG. 3, is to extrude the soap in the form of a tube 14 with the bore 15 offcenter. The capsule 11 may be inserted within the bore 15 and subsequently the tube containing the capsule may be compressed within a stamping die to form the desired object, such as a miniature whale, submarine, ship or other toy object.

Figure 5:
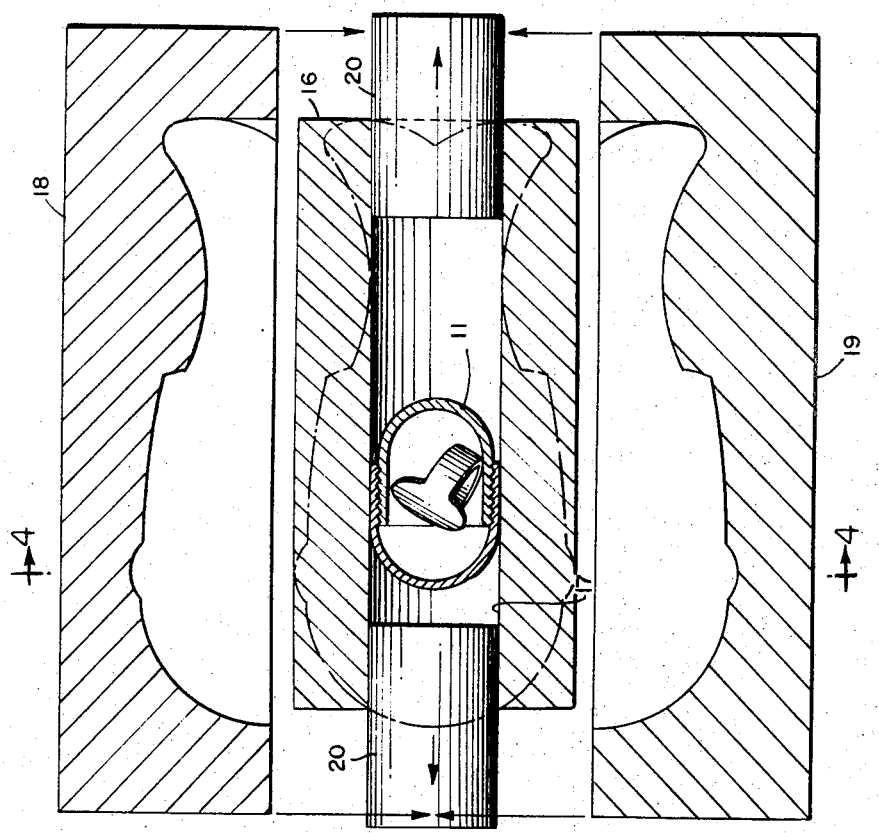

Another method, as illustrated in FIGS. 4 and 5, is to extrude a tube 16 having a concentric bore 17, and into the concentric bore 17 is inserted the capsule 11. If desired, supporting pins 20 may be inserted into the ends of the tube 16 to aid in positioning the tube between the complementary mold segments 18 and 19.

As illustrated best in FIG. 5, with the die parts 18 and 19 movable toward each other in a vertical plane, the operator may move the tube 16 laterally in a plane parallel with the die segments 18 and 19 so as to position the capsule 11 with its median line slightly above the median line of the finished cake of soap, as shown best in FIG. 4. The finished or molded cake of soap is indicated by the dotted line 21. More specifically, with the structure shown in FIG. 2, the operator will move the tube 16 slightly toward himself and when the mold parts 18 and 19 are brought together, the capsule 11 is positioned off-center, as illustrated best in FIG. 4.

From the foregoing, it will be seen that the capsule may be positioned accurately and expeditiously within a cake of soap with its median line above the median line of the finished cake of soap by either forming the tube with an eccentric bore into which the capsule is placed, or by forming the tube with a concentric bore into which the capsule is placed, and, in the latter procedure, the tube is moved laterally with respect to vertically movable molds so as to position the capsule in the position shown in FIG. 4.

By "center of volume" we mean the point within the soap cake where there is an intersection of planes passing through the three axes (horizontal, normal and lateral) of the soap cake. Each of the planes divides the soap cake into two equal volumes, and the intersection of the three axes forms the center of volume. In a body formed of homogeneous material, the center of volume and the center of mass coincide. The "center of mass" is determined in the same way except that in this case each of such planes divides the soap cake in two parts of equal weight.

By introducing a capsule within the cake of soap, the center of volume is not changed, but there is a change in the center of mass. By locating the capsule within the cake of soap so that the center of volume of the cake is above its center of mass, the upper side of the cake of soap which is contoured to give it a distinctive form, preferably in the shape of a toy, is maintained uppermost when placed in water. Any type of soap may be employed, but we prefer to use a hard milled soap which resists dissolution in water. The specific gravity of soap cakes prepared in accordance with our invention will be from 0.96–0.98.

To obtain the soap in tubular form, the customary soap ingredients are introducted into an amalgamator and mixed. From the amalgamator, the mixed soap ingredients are carried through a plodder in which the soap mass is kneaded, and the soap mass is then ejected by the screw conveyor in a continuous soap tube from the extruder. The soap mass is held at a suitable temperature, such as about 90–110° F., to keep it in a pliable state during the extrusion process. The extruded tube is sectioned, and while the tube section is in a pliable or plastic stage, the capsule 11 is inserted, preferably with the prize object 13 therein, and the tube section placed in a stamping frame or mold in which it is pressed into the final desired form. After release of the soap cake from the molds and after cooling, the soap recovers its hard texture and the telescoping capsule parts are firmly anchored within the soap cake.

In the foregoing specification, a whale design has been set out as illustrative of the invention and a movable prize item has been illustrated by a ring. It will be understood that many designs may be employed to form attractive toys, preferably of a mobile type, and also the arrangement of the capsule within the cake may be accomplished by methods other than those herein described.

A specific example illustrative of the invention may be set out as follows:

Example I

A tube section of soap having a concentric bore 17, as shown in FIGS. 4 and 5 of the drawing, was prepared, and therefrom a simulated whale, as shown in FIG. 1 of the drawing, was prepared, the tube section weighing approximately 202 grams. The tube was 5" long, having an outside diameter of 2", and a center passage 17 having a diameter of $15/16$". A capsule 11 had a diameter of $31/32$", being $1/32$" larger than the diameter of passage 17, and the length of the capsule was $1\frac{3}{8}$". The capsule was pushed into the passage 17 until one end of the capsule was $1\frac{1}{2}$" from the end of tube 16. The simulated whale was then formed by stamping, during which the weight was reduced by about 80 grams by removal of soap to provide a center of mass in the formed whale which was below its center of volume when floating in an upright position. The original tube of soap had a specific gravity of 1.02. After the addition of the capsule and the forming of the whale body, the cake of soap had a specific gravity of .97. Before inserting the capsule, a metal ring was placed within the capsule and was freely slidable within the capsule, and the capsule segments having threaded inner edges were screwed together to form a closed capsule.

In the stamping operation, the tube 16 was moved laterally in a plane parallel with the die segments 18 and 19 of the drawing so as to position the capsule 11 with its median line slightly above the median line of the finished cake of soap, as illustrated in FIG. 4. When the die segments were brought together, about 80 grams of the soap were removed, and the finished cake of soap simulating a miniature whale had its center of volume above its center of mass, as illustrated in FIG. 1.

While in the foregoing specification we have set forth embodiments of the invention in considerable detail for the purpose of illustrating the invention, it will be understood that such detail or details may be varied widely by those skilled in the art without departing from the spirit of our invention.

We claim:

1. In combination, a buoyant cake of soap contoured to simulate a mobile object with a distinctive top side visible when the cake is floating in water, an elongated plastic hollow capsule mounted within said cake and having its center of volume above the center of volume of said soap cake to maintain said distinctive top of the mobile uppermost, and a movable object within said capsule and freely slidable from one end of the capsule to the other to tilt the mobile object while floating in the water.

2. The product of claim 1 in which said capsule is formed of separable parts and said movable object within the capsule occupies less than half of the longitudinal bore of said capsule.

References Cited

UNITED STATES PATENTS

| 650,760 | 5/1900 | Metcalf | 167—83 |
|---|---|---|---|
| 1,580,227 | 4/1926 | Wilhelm | 46—92 |
| 2,849,831 | 9/1958 | Swartz | 248—359 |
| 3,097,057 | 7/1963 | Takeuchi | 25—7 |
| 3,242,522 | 3/1966 | Jass et al. | 215—43 |

FOREIGN PATENTS

| 27,233 | 1898 | Great Britain. |
|---|---|---|
| 819,701 | 9/1959 | Great Britain. |

LEON D. ROSDOL, *Primary Examiner.*

W. E. SHULZ, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,403,106                          September 24, 1968

Julian R. Story et al.

It is certified that error appears in the above identified patent and that said Letters Patent are hereby corrected as shown below:

Column 1, line 15, "boyant" should read -- buoyant --.
Column 4, line 27, after "mobile" insert -- object --.

Signed and sealed this 17th day of February 1970.

(SEAL)
Attest:

Edward M. Fletcher, Jr.                      WILLIAM E. SCHUYLER, JR.
Attesting Officer                                Commissioner of Patents